(12) United States Patent
Nasir et al.

(10) Patent No.: US 10,298,533 B2
(45) Date of Patent: May 21, 2019

(54) INTELLIGENT PRESENCE BASED MESSAGING

(71) Applicant: Verizon Patent and Licensing Inc., Basking Ridge, NJ (US)

(72) Inventors: Azim Nasir, Foxboro, MA (US); Andre R. Turner, Belmont, MA (US); Hong Xiao, Acton, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 843 days.

(21) Appl. No.: 14/100,818

(22) Filed: Dec. 9, 2013

(65) Prior Publication Data

US 2015/0163187 A1     Jun. 11, 2015

(51) Int. Cl.
*H04L 12/24* (2006.01)
*H04L 12/58* (2006.01)

(52) U.S. Cl.
CPC ............ *H04L 51/24* (2013.01); *H04L 51/043* (2013.01)

(58) Field of Classification Search
CPC ........ H04L 51/24; H04L 12/58; H04L 51/043
USPC ........................................................ 709/206
See application file for complete search history.

(56) References Cited

U.S. PATENT DOCUMENTS

| | | | |
|---|---|---|---|
| 9,809,169 B1 * | 11/2017 | Naboulsi ................. | B60R 1/025 |
| 2002/0128000 A1 * | 9/2002 | do Nascimento, Jr. ...................... | |
| | | | H04W 4/12 |
| | | | 455/414.1 |
| 2005/0221841 A1 * | 10/2005 | Piccionelli ............ | H04W 48/04 |
| | | | 455/456.3 |
| 2006/0099969 A1 * | 5/2006 | Staton ................. | G08B 21/0211 |
| | | | 455/456.4 |
| 2007/0072616 A1 * | 3/2007 | Irani ................... | H04M 1/6075 |
| | | | 455/441 |
| 2007/0143472 A1 * | 6/2007 | Clark ...................... | H04L 43/00 |
| | | | 709/224 |
| 2010/0216509 A1 * | 8/2010 | Riemer ............. | H04M 1/72577 |
| | | | 455/557 |
| 2011/0034185 A1 * | 2/2011 | Hartmaier ............... | H04W 4/02 |
| | | | 455/456.4 |
| 2011/0195699 A1 * | 4/2011 | Tadayon | |
| 2011/0105097 A1 * | 5/2011 | Tadayon ............... | H04W 4/025 |
| | | | 455/418 |
| 2011/0223939 A1 * | 9/2011 | Osann, Jr. ............... | H04M 1/67 |
| | | | 455/456.3 |
| 2011/0264246 A1 * | 10/2011 | Pantoja .................. | G06Q 30/02 |
| | | | 700/92 |
| 2012/0179767 A1 * | 7/2012 | Clarke .................... | H04L 51/34 |
| | | | 709/206 |
| 2012/0238286 A1 * | 9/2012 | Mallavarapu ..... | H04M 1/72577 |
| | | | 455/456.1 |
| 2013/0203400 A1 * | 8/2013 | Ricci .................... | H04W 4/046 |
| | | | 455/418 |

(Continued)

*Primary Examiner* — Moustafa M Meky
*Assistant Examiner* — Elizabeth Kassa

(57) ABSTRACT

A method, performed by a computer device, may include receiving a request to send a message from a sender to a recipient. The method may further include obtaining a recipient status associated with the recipient, wherein in the recipient status includes an indication that the recipient is in motion; identifying a sender rule associated with the sender; selecting a notification type for the message based on the recipient status and the identified sender rule; and applying the selected notification type to the message.

16 Claims, 14 Drawing Sheets

(56) References Cited

U.S. PATENT DOCUMENTS

2013/0204943 A1* 8/2013 Ricci .................. G06F 3/0484
                                                              709/204
2013/0281079 A1* 10/2013 Vidal .................. H04W 8/22
                                                              455/418

* cited by examiner

_US 10,298,533 B2_

INTELLIGENT PRESENCE BASED MESSAGING

BACKGROUND INFORMATION

With advances in mobile communication technology, sending and receiving of messages has skyrocketed. Users of mobile communication devices may receive a large number of messages. When a user receives a message, the user may be notified by the mobile communication device about the received message and may be tempted to look at the message and/or respond even though the user may not be in a safe situation. For example, the user may be driving when the user receives a message. A large number of accidents have been caused by users as a result of texting while driving.

DETAILED DESCRIPTION OF PREFERRED EMBODIMENTS

The following detailed description refers to the accompanying drawings. The same reference numbers in different drawings identify the same or similar elements.

Implementations described herein relate to intelligent presence based messaging. A user device may be configured to enable a user to generate and configure a sender rule. The sender rule may be applied to messages sent by the sender to another user (i.e., a recipient). The sender rule be applied to a particular message type based on a recipient status associated with the recipient and may specify a particular notification type based on a particular recipient status. For example, a sender rule may specify that a text message sent to a recipient that is moving (e.g., faster than a particular speed) should be sent with a silent notification. Furthermore, in some implementations, a sender may be provided with information about the status of the recipient (e.g., that the recipient is in motion, indicating that the recipient may be driving).

Furthermore, in some implementations, an account may include multiple user devices and one of the user devices may be selected as an administration device. The administration device may be used to configure a messaging rule, for the duration of a particular time period, and may push the rule to one or more of the multiple user devices. For example, the administration device may push a rule to another device that the other device is not to receive notifications about any incoming messages during the time period and that outbound messages are only allowed if the other device is stationary. As another example, the administration device may push a rule to all the devices associated with the account that during the particular time period, only messages from a sender that is on a designated safe list will generate a notification.

Moreover, in some implementations, a messaging rule may be generated based on a geographic area. For example, if a user enters a state that has a law banning sending text messages while driving, the user device may generate a messaging rule that does not allow text messages to be sent while the user device is in motion. The user may be able to override any messaging rule for emergency or urgent messages.

A "message," as the term is used herein, may refer to any communication between user devices. For example, a message may include a telephone call from one user device to another user device, a voicemail message or another type of audio message, a video call or a video message, a text message (e.g., a Short Message Service (SMS) message, a Multimedia Messaging Service (MMS) message, etc.), an email message, an instant messaging (IM) message, a social media account message, update, or notification (e.g., Facebook messages, Twitter messages, Whatsapp messages, etc.), and/or another type of message.

Figure 1:
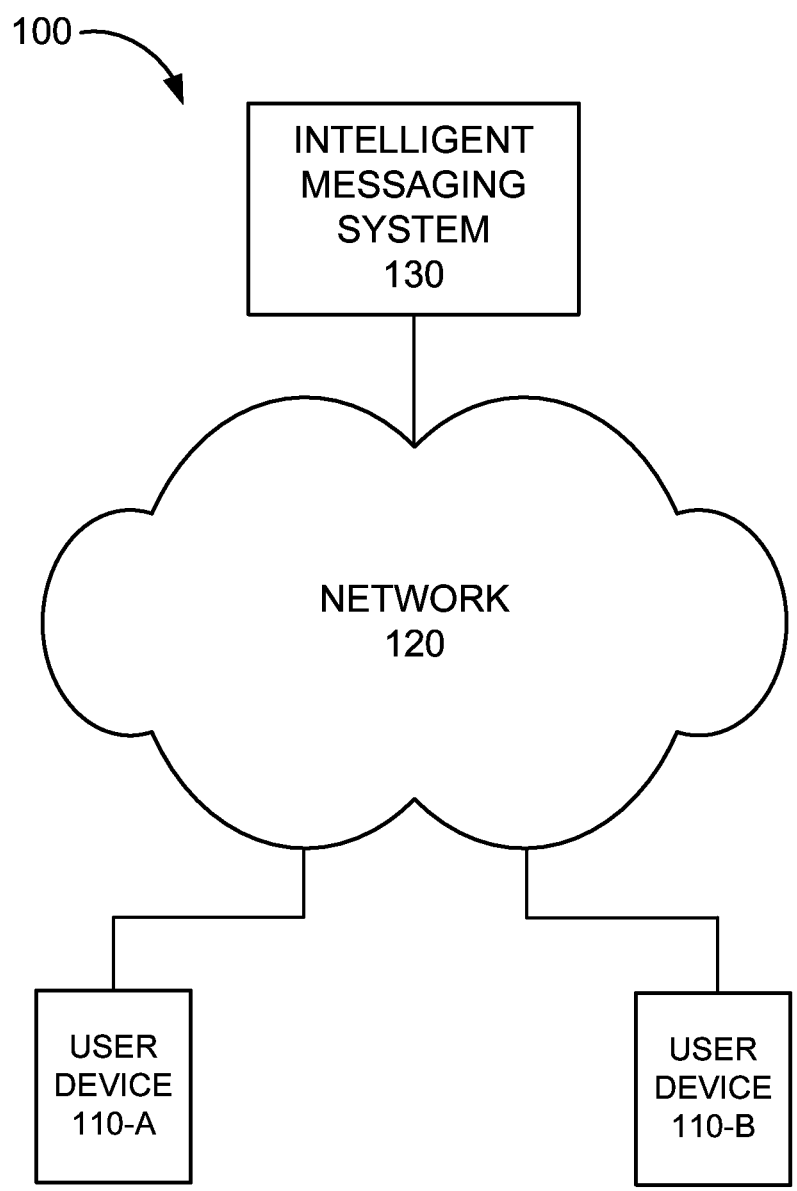
FIG. 1 is a diagram illustrating an environment according to an implementation described herein.

FIG. 1 is a diagram of an exemplary environment 100 in which the systems and/or methods described herein may be implemented. As shown in FIG. 1, environment 100 may include user devices 110-A and 110-B, a network 120, and an intelligent messaging system 130.

User devices 110-A and 110-B (referred to herein collectively as "user devices 110" and individually as "user device 110") may include any device that includes functionality to communicate with other user devices 110 via telephone calls, text messages (also referred to as Short Messaging Service (SMS) messages), instant messaging (IM) messages, social media account messages (e.g., Facebook messages, Twitter messages, Whatsapp messages, etc.), and/or other types of messages. For example, user device 110 may include a portable communication device (e.g., a mobile phone, a smart phone, a phablet device, a global positioning system (GPS) device, and/or another type of wireless device); a personal computer or workstation; a server device; a laptop, tablet, or another type of portable computer; a media playing device; a portable gaming system; and/or any other type of computer device with communication and content access capabilities. User device 110-A may send a message to user device 110-B via network 120 and the message may be processed by user device 110-A and/or intelligent messaging system 130 based on one or more messaging rules.

Network 120 may enable user devices 110 to communicate with each other and to communicate with intelligent messaging system 130. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Intelligent messaging system 130 may include one or more devices, such as computer devices and/or server devices, which may receive a message from sender user device 110-A to recipient user device 110-B, may select a sender rule to associated with sender user device 110-A, may determine a recipient status for recipient user device 110-B, and may select a notification type for the message based on the selected sender rule and the determined recipient status. For example, intelligent messaging system 130 may delay notification of the message until recipient user device 110-B has stopped moving. Furthermore, in some implementations, intelligent messaging system 130 may provide information regarding the recipient status to sender user device 110-A.

Although FIG. 1 shows exemplary components of environment 100, in other implementations, environment 100 may include fewer components, different components, differently arranged components, or additional components than the ones depicted in FIG. 1. Additionally or alternatively, one or more components of environment 100 may perform functions described as being performed by one or more other components of environment 100. Furthermore, while FIG. 1 shows two user devices 110, a single network 120, and a single intelligent messaging system 130 for illustrative purposes, in practice, environment 100 may include more than two user devices 110, multiple networks 120, and/or multiple intelligent messaging systems 130.

Figure 2:
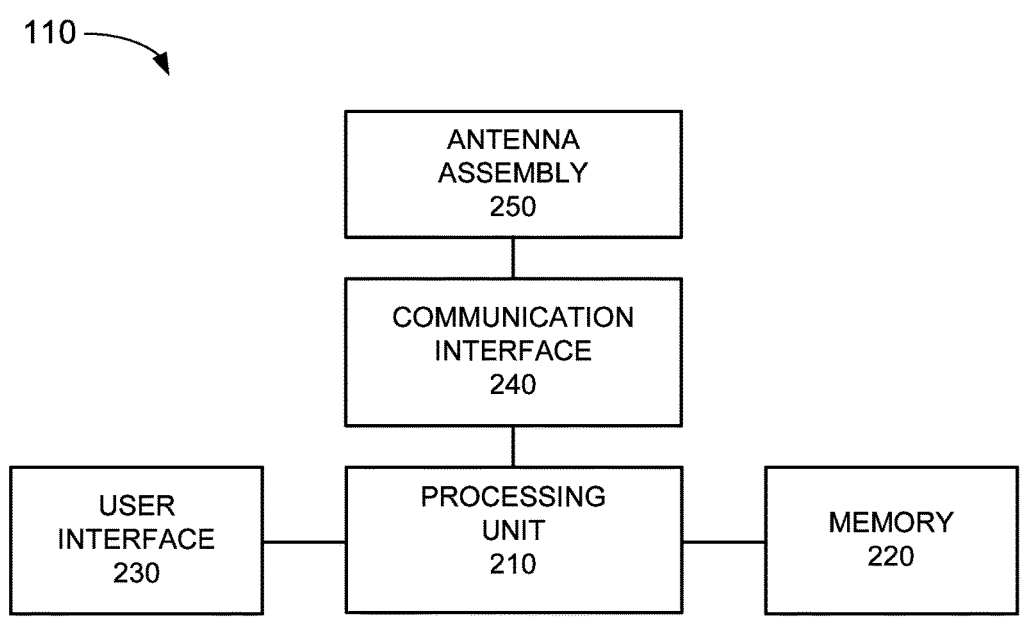
FIG. 2 is a diagram illustrating exemplary components of the user device of FIG. 1.

FIG. 2 is a diagram illustrating example components of a user device 110 according to an implementation described herein. As shown in FIG. 2, user device 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), and/or other processing logic. Processing unit 210 may control operation of user device 110 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may allow a user to input information to user device 110 and/or to output information from user device 110. Examples of user interface 230 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause user device 110 to vibrate; and/or any other type of input or output device.

Communication interface 240 may include a transceiver that enables user device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals. Antenna assembly 250 may, for example, receive RF signals from communication interface 240 and transmit the signals and receive RF signals and provide them to communication interface 240.

As described herein, user device 110 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 2 shows example components of user device 110, in other implementations, user device 110 may include fewer components, different components, differently arranged components, or additional components than depicted in FIG. 2. Additionally or alternatively, one or more components of user device 110 may perform the tasks described as being performed by one or more other components of user device 110.

Figure 3A:
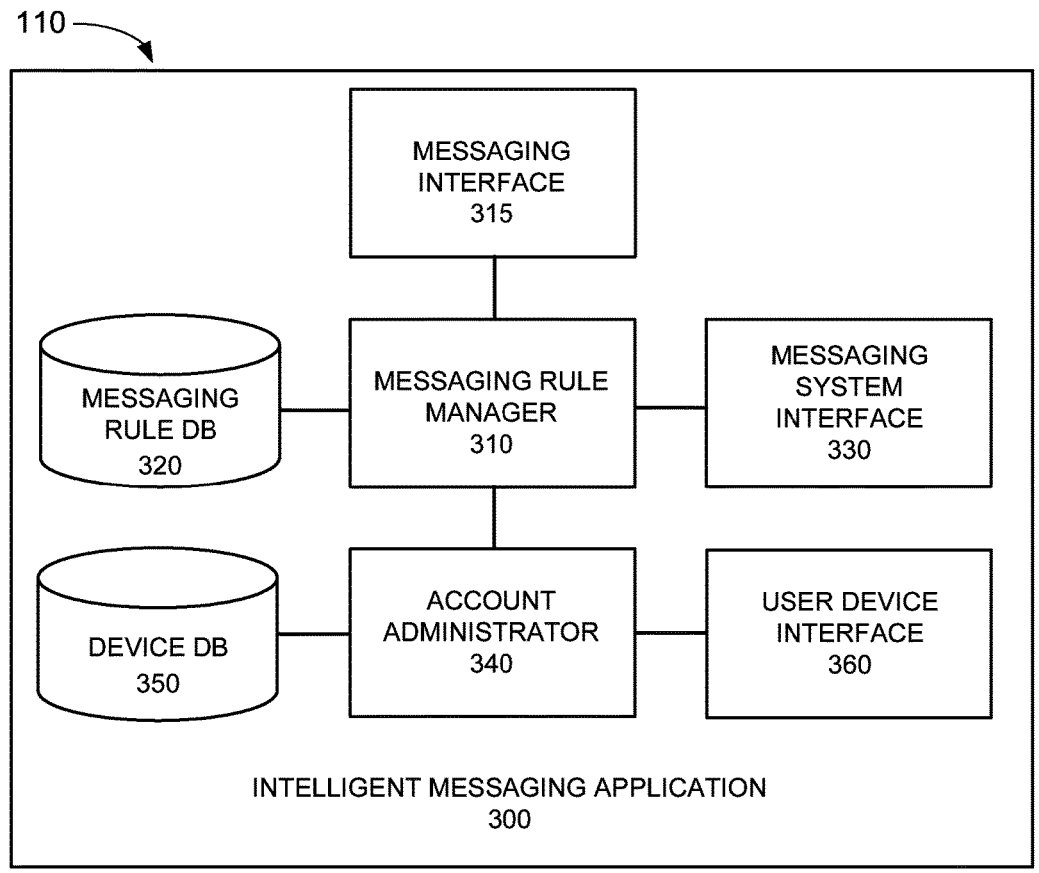
FIG. 3A is a diagram illustrating exemplary functional components of the user device of FIG. 1.

FIG. 3A is a diagram illustrating exemplary functional components of user device 110 according to an implementation described herein. The functional components of user device 110 may be implemented, for example, via processing unit 210 executing instructions from memory 220. Alternatively, some or all of the functional components of user device 110 may be implemented via hard-wired circuitry. As shown in FIG. 3A, user device 110 may include an intelligent messaging application 300. Intelligent messaging application 300 may be provided to user device 110 by intelligent messaging system 130, may be pre-configured on user device 110, and/or may be downloaded by the user from another device. Intelligent messaging application 300 may enable a user to configure messaging rules for user device 110 and/or for other user devices 110 associated with the user's account. Intelligent messaging application 300 may include a messaging rule manager 310, a messaging interface 315, a messaging rule database (DB) 320, a messaging system interface 330, an account administrator 340, a device DB 350, and a user device interface 360.

Messaging rule manager 310 may manage messaging rules associated with user device 110. For example, messaging rule manager 310 may enable a user to configure a sender rule and may apply the sender rule to a message generated by the user. In some implementations, messaging rule manager 310 may process the sender rule locally in user device 110. In other implementations, messaging rule manager 310 may send the message to intelligent messaging system 130 for processing.

Messaging interface 315 may provide a user interface to the user of user device 110. As an example, messaging interface 315 may provide a user interface to enable a user to configure a sender rule. Furthermore, messaging interface 315 may provide information relating to the recipient status of an intended recipient of a message to the user sending the message. In some implementations, messaging interface 315 may obtain the recipient status information from intelligent messaging system 130 and may generate an icon associated with the recipient status. As an example, if the intended recipient is in motion, an icon indicating a moving recipient may be displayed in connection with the contact information of the intended recipient. In some implementations, the icon may be provided in response to the sender selecting to send the message to the intended recipient. In other implementations, messaging interface 315 may obtain recipient status information for contacts in the sender's address book at particular intervals from intelligent messaging system 130.

As another example, a message may be provided to the sender about the recipient status of the intended recipient and the sender may be provided with an option to modify the message. For example, if the sender sent a text message to an intended recipient that is moving (e.g., the intended recipient may be driving), messaging interface 315 may inform the sender and may provide the sender with an option to convert the text message to a voicemail message.

Messaging rule DB 320 may store information relating to messaging rules associated with user device 110. Exemplary information that may be stored in messaging rule DB 320 is described below with reference to FIG. 3B.

Messaging system interface 330 may communicate with intelligent messaging system 130. As an example, messaging system interface 330 may forward a message from user device 110 to intelligent messaging system 130 for processing. As another example, messaging system interface 330 may receive information about the recipient status of an intended recipient of a message from intelligent messaging system 130. As yet another example, messaging system interface 330 may receive information relating to messaging laws associated with a particular geographic area.

Account administrator 340 may administer other user devices 110 associated with the user's account. For example, account administrator 340 may select one or more of the other user devices 110 for a particular messaging rule and may push the particular messaging rule to the selected other user devices 110. For some messaging rules, account administrator 340 may create a safe list of senders and while a messaging rule with a safe list is in effect, a message may be accepted only if was sent by a user and/or user device 110 included on the safe list.

Device DB 350 may store information relating to the other user devices 110 associated with the user's account. For example, device DB 350 may store one or more identifiers associated each other user device 110 associated with the user's account, such as a mobile device identifier (e.g., a Mobile Subscriber Integrated Services Digital Network number (MSISDN), an International Mobile Subscriber Identity (IMSI) number, a mobile identification number (MIN), an International Mobile Equipment Identifier (IMEI), an Integrated Circuit Card Identifier (ICCI), and/or any other mobile communication device identifier), an Internet Protocol (IP) address associated with a user device 110, a Media Access Control (MAC) address associated with a user device 110, and/or another type of user device identifier. Furthermore, each mobile device identifier may be associated with information identifying a particular user. For example, a family account may include four user devices, and each user device 110 may be associated with a particular family member that is identified in devices DB 350.

User device interface 360 may interface with other user devices 110 associated with the user's account. For example, account administrator 340 may use user device interface 360 to push a messaging rule to another user device 110.

Although FIG. 3A shows exemplary functional components of user device 110, in other implementations, user device 110 may include fewer functional components, different functional components, differently arranged functional components, or additional functional components than depicted in FIG. 3A. Additionally or alternatively, one or more functional components of user device 110 may perform functions described as being performed by one or more other functional components of user device 110.

Figure 3B:
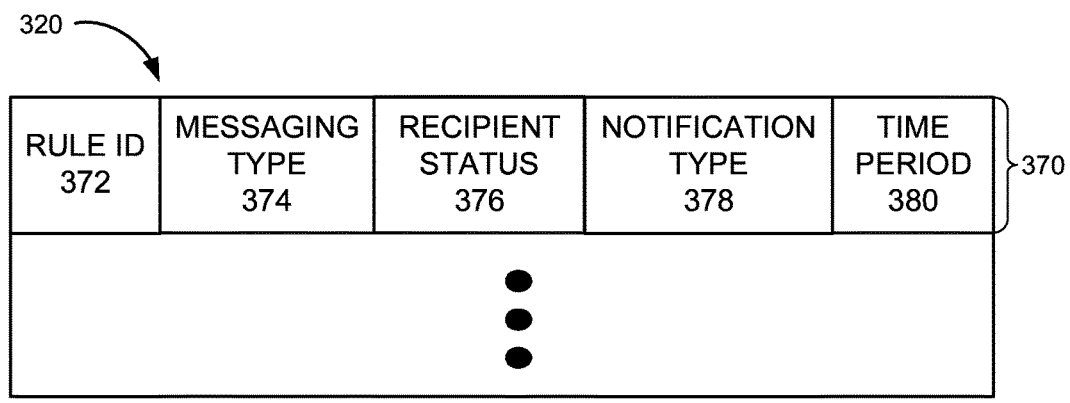
FIG. 3B is a diagram illustrating exemplary components of the messaging rule database of FIG. 3A.

FIG. 3B is a diagram of exemplary components of messaging rule DB 320. As shown in FIG. 3B, messaging rule DB 320 may store one or more messaging rule records 370. Each messaging rule record 370 may store information relating to a particular messaging rule. Messaging rule record 370 may include a rule identifier (ID) field 372, a messaging type field 374, a recipient status field 376, a notification type field 378, and a time period field 380.

Rule ID field 372 may store information identifying a particular messaging rule, such as a name assigned to the particular messaging rule by the user. Messaging type field 374 may identify one or more message types associated with the particular messaging rule. For example, messaging type field 374 may identify one or more of a telephone call, a voicemail message, a video call, a video message, a text message, an email message, an IM message, a social media account message, and/or another type of message. Moreover, messaging type field 374 may specify whether the one or more message types apply to incoming messages, outgoing messages, or both incoming and outgoing messages.

Recipient status field 376 may identify a particular recipient status associated with the particular messaging rule. As an example, the particular recipient status may correspond to the recipient being in motion. As another example, the particular recipient status may correspond to the recipient moving faster than a particular speed (e.g., above 10 miles per hour).

Notification type field 378 may identify a particular notification type associated with the particular messaging rule. For example, notification type field 378 may include an instruction to hold the message and to provide no notification to the recipient, an instruction to hold the message and to send a silent notification to the recipient, an instruction to send the message and to send the silent notification to the recipient, an instruction to convert a text message to a voicemail message, and/or an instruction to send a voice call directly to voicemail.

Time period field 380 may including information identifying a particular time period associated with the particular messaging rule. The particular time period may correspond to a particular time of day, a particular day of the week, a particular range of times, a particular range of dates, and/or another type of time period.

Although FIG. 3B shows example components of key DB 320, in other implementations, key DB 320 may include fewer components, different components, differently arranged components, or additional components than depicted in FIG. 3B.

Figure 4:
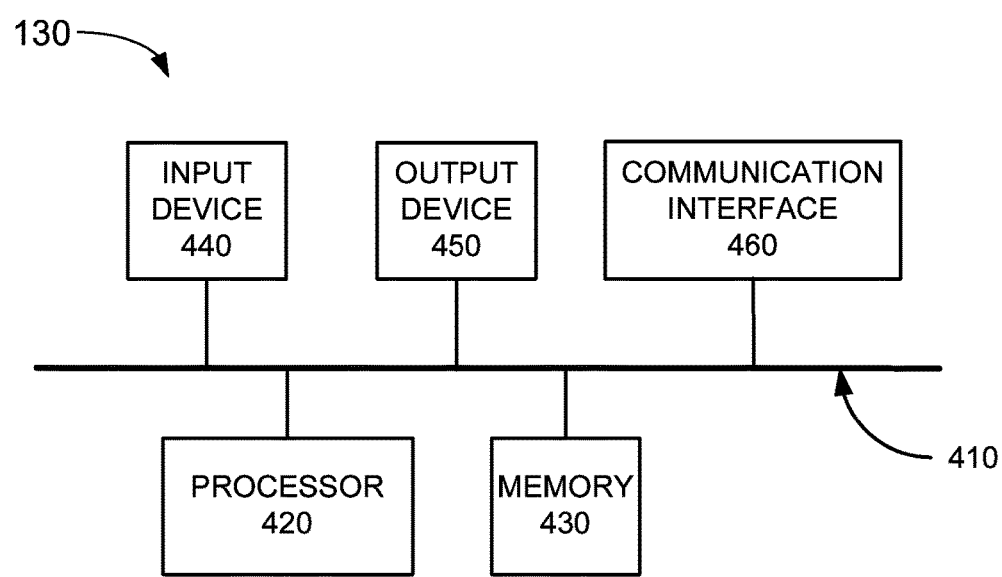
FIG. 4 is a diagram illustrating exemplary components of the intelligent messaging system of FIG. 1.

FIG. 4 is a diagram illustrating exemplary components of intelligent messaging system 130 according to an implementation described herein. As shown in FIG. 4, intelligent messaging system 130 may include a bus 410, a processor 420, a memory 430, an input device 440, an output device 450, and a communication interface 460.

Bus 410 may include a path that permits communication among the components of intelligent messaging system 130. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into intelligent messaging system 130. Input device 440 may include, for example, a keyboard, a mouse, a pen, a microphone, a remote control, an audio capture device, an image and/or video capture device, a touch-screen display, and/or another type of input device. In some embodiments, intelligent messaging system 130 may be managed remotely and may not include input device 440. In other words, intelligent messaging system 130 may be "headless" and may not include a keyboard, for example.

Output device 450 may output information to an operator of intelligent messaging system 130. Output device 450 may include a display, a printer, a speaker, and/or another type of output device. For example, intelligent messaging system 130 may include a display, which may include a liquid-crystal display (LCD) for displaying content to the customer. In some embodiments, intelligent messaging system 130 may be managed remotely and may not include output device 450. In other words, intelligent messaging system 130 may be "headless" and may not include a display, for example.

Communication interface 460 may include a transceiver that enables intelligent messaging system 130 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to an antenna for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, intelligent messaging system 130 may perform certain operations relating to processing of messages based on messaging rules. Intelligent messaging system 130 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of intelligent messaging system 130, in other implementations, intelligent messaging system 130 may include fewer components, different components, additional components, or differently arranged components than depicted in FIG. 4. Additionally or alternatively, one or more components of intelligent messaging system 130 may perform one or more tasks described as being performed by one or more other components of intelligent messaging system 130.

Figure 5:
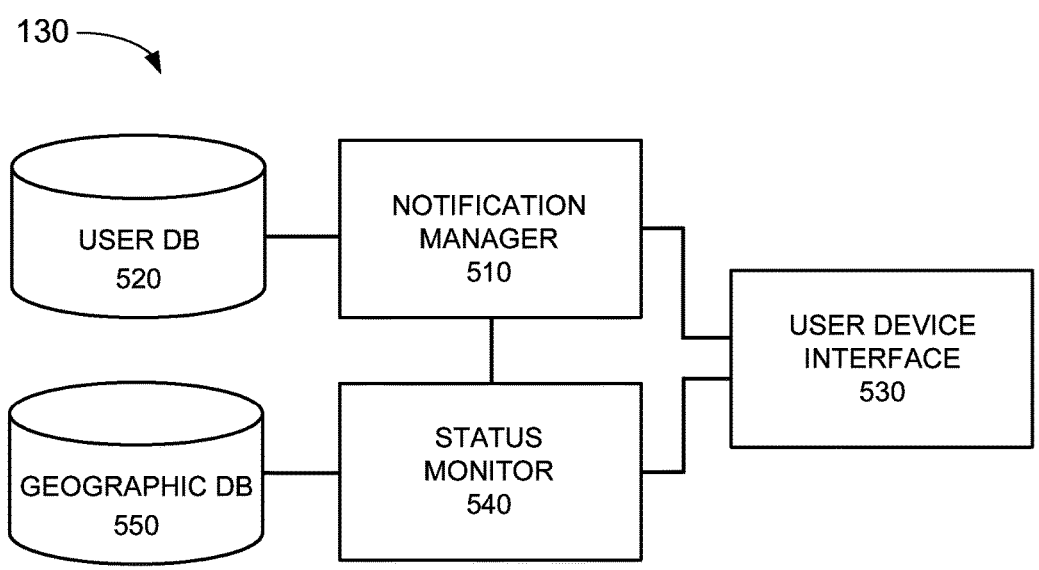
FIG. 5 is a diagram illustrating exemplary functional components of the intelligent messaging system of FIG. 1.

FIG. 5 is a diagram illustrating exemplary functional components of intelligent messaging system 130. The functional components of intelligent messaging system 130 may be implemented, for example, via processor 420 executing instructions from memory 430. Additionally or alternatively, some or all of the functional components of intelligent messaging system 130 may be hard-wired. In some implementations, intelligent messaging system 130 may handle multiple types of messages. In other implementations, different intelligent messaging systems 130 may handle different types of messages. For example, a first intelligent messaging system 130 may be implemented in an SMS server to handle intelligent messaging of SMS messages, a second intelligent messaging system 130 may be implemented by an IP Multimedia Subsystem (IMS) to handle intelligent messaging of Session Initiation Protocol (SIP) messages, etc.

As shown in FIG. 5, intelligent messaging system 130 may include a notification manager 510, a user DB 520, a user device interface 530, a status monitor 540, and a geographic DB 550. Notification manager 510 may manage the sending of notifications to intended recipients of messages based on one or more messaging rules. For example, notification manager 510 may receive and/or intercept a message from sender user device 110-A to a recipient user device 110-B, may obtain a recipient status associated with an intended recipient of the message, may retrieve a sender rule associated with the message based on the sender of the message, and may select a notification type for the message based on the retrieved sender rule. The selected notification type may then be applied to the received message.

User DB 520 may store information relating to users of user devices 110. For example, user DB 520 may identify, for a particular user, an account associated with the user, one or more user devices 110 associated with the account, and/or messaging rules associated with particular ones of the one or more user devices 110.

User device interface 530 may communicate with user devices 110. For example, user device interface 530 may obtain a message from a sender, may provide a message to a recipient, may obtain a recipient status from an intended recipient, may provide a recipient status to a sender, and/or may provide information relating to laws associated with a geographic area to a user.

Status monitor 540 may obtain a recipient status from user device 110. For example, status monitor 540 may determine whether the recipient is moving based on movement information associated with user device 110 associated with the recipient. The movement information may be obtained based on Global Positioning System (GPS) receiver data of user device 110, multilateration data obtained by base stations or other transceivers communicating with user device 110, sensor data obtained by movement sensors in user device 110 (e.g., an accelerometer, gyroscope, etc.), and/or based on other types of movement data obtained for user device 110. Geographic DB 550 may store information relating to messaging laws associated with particular geographic areas. For example, geographic DB 550 may store information relating to whether a particular state has banned texting while driving. Status monitor 540 may obtain recipient status information, or information used to determine recipient status, from user device 110 with the permission of the user of user device 110.

In some implementations, status monitor 540 may be able to distinguish, for at least some recipients, whether a recipient is a driver or a passenger. As an example, status monitor 540 may use historical data associated with a user to estimate whether the user is driving based on the user's routines. Thus, if the user is in motion during particular times each day and the route taken by the user does not significantly change and does not correspond to a route associated with public transportation, status monitor 540 may estimate that the user is driving. As another example, user device 110 may collect information about whether the user is the driver based on the proximity of user device 110 to one or more sensors located in the user's vehicle. As yet another example, user device 110 may use a camera included in user device 110 to capture images of the user's environment and may perform image analysis to determine whether the user is the driver of a vehicle. As yet another example, user device 110 may use motion sensors included in user device 110 to determine whether the user's movements, in handling user device, are indicative of the user being the driver. If status monitor 540 determines that the recipient may likely be a driver, status monitor 540 may designate the recipient status as "recipient may be driving."

Although FIG. 5 shows exemplary functional components of intelligent messaging system 130, in other implementations, intelligent messaging system 130 may include fewer functional components, different functional components, differently arranged functional components, or additional functional components than depicted in FIG. 5. Additionally or alternatively, one or more functional components of intelligent messaging system 130 may perform functions described as being performed by one or more other functional components of intelligent messaging system 130.

Figure 6:
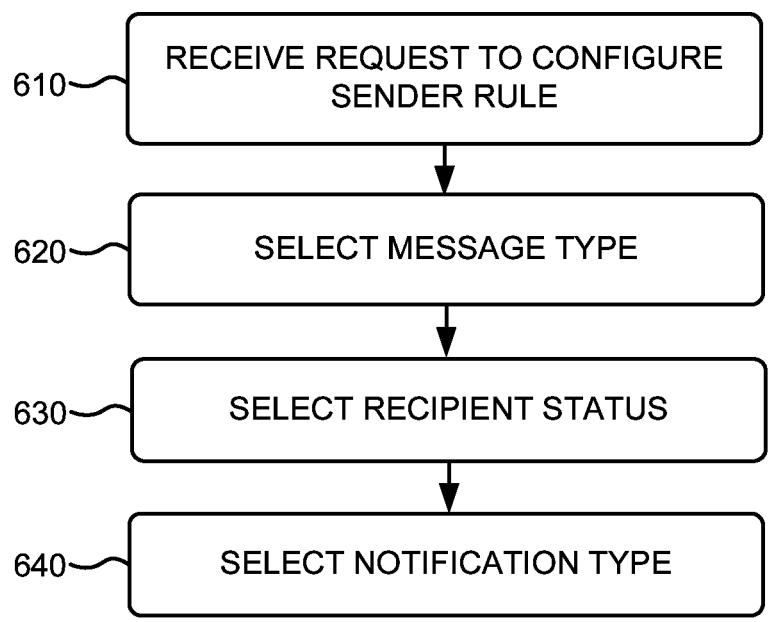
FIG. 6 is a flowchart for configuring a messaging rule according to an implementation described herein.

FIG. 6 is a flowchart for configuring a messaging rule according to an implementation described herein. In one implementation, the process of FIG. 6 may be performed by user device 110. In other implementations, some or all of the process of FIG. 6 may be performed by another device or a group of devices separate from and/or including user device 110, such as intelligent messaging system 130.

The process of FIG. 6 may include receiving a request to configure a sender rule (block 610). For example, a user may activate messaging interface 315 and may select to create a sender rule. In some implementations, a sender may be configured automatically in response to an event associated with user device 110. For example, a sender rule may be created automatically for a contact when a new contact is created, when the user enters a new geographic area (e.g., a new state, county, city, etc.), etc.

A message type may be selected (block 620). For example, the user may select whether the sender rule applies to one or more of a telephone call, a voicemail message, a video call, a video message, a text message, an email message, an IM message, a social media account message, and/or another type of message. A recipient status may be selected (block 630). As an example, the user may specify that the sender rule is to be applied when the recipient status corresponds to the intended recipient being in motion. As another example, the user may specify that the sender rule is to be applied when the recipient status corresponds to the intended recipient moving faster than a particular speed (e.g., above 10 mph). As yet another example, in implementations in which intelligent messaging system 130 is able to distinguish between whether a recipient is a driver or a passenger, the user may specify that the sender is to be applied when the intended recipient is the driver, or the likely driver, of a vehicle.

A notification type may be selected (block 640). For example, the user may select to hold the message and to provide no notification to the recipient, to hold the message and to send a silent notification to the recipient, to send the message and to send the silent notification to the recipient, to convert a text message to a voicemail message, to send a voice call directly to voicemail, and/or may select another notification type. The configured sender rule may be stored in messaging rule DB 320.

Figure 7:
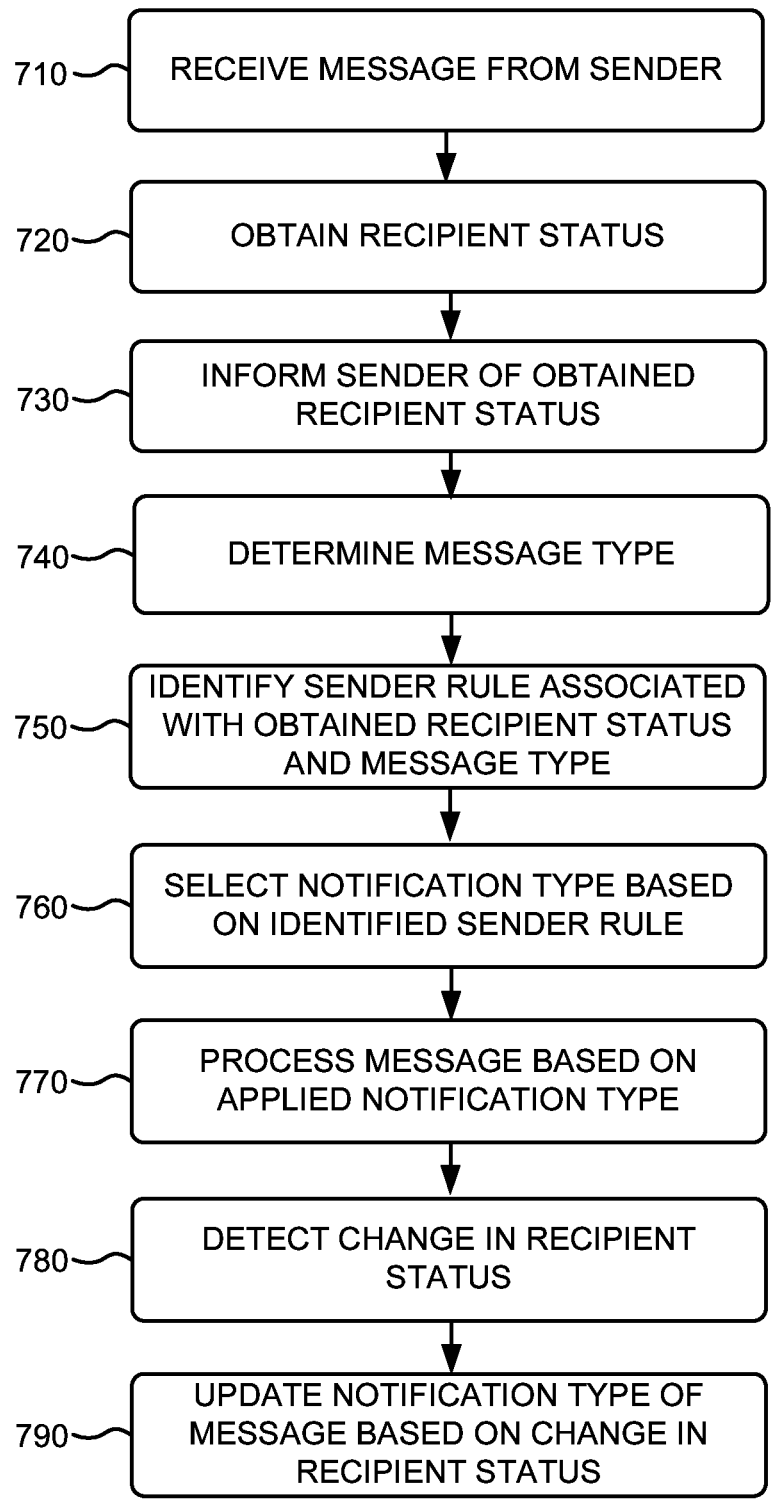
FIG. 7 is a flowchart for processing a message based on a sender rule according to an implementation described herein.

FIG. 7 is a flowchart for processing a message based on a sender rule according to an implementation described herein. In one implementation, the process of FIG. 7 may be performed by user device 110. In other implementations, some or all of the process of FIG. 7 may be performed by another device or a group of devices separate from and/or including user device 110, such as intelligent messaging system 130.

The process of FIG. 7 may include receiving a message from a sender (block 710). For example, the sender may send a text message to an intended recipient, may post a social media update or notification (e.g., a Facebook post, a Twitter tweet, etc.), may send an IM message to the intended recipient, etc. User device 110 and/or intelligent messaging system 130 may determine whether a sender rule has been generated by the sender and whether any sender rules apply to the received message.

Recipient status may be obtained (block 720). For example, status monitor 540 may obtain the recipient status of the intended recipient based on information obtained from user device 110 associated with the intended recipient. Status monitor 540 may determine whether the intended recipient is in motion, the speed at which the intended recipient is moving, whether the intended recipient is the likely driver of a vehicle, and/or may determine whether the intended recipient is associated with another type of recipient status.

The sender may be informed of the obtained recipient status (block 730). In some implementations, intelligent messaging system 130 may provide information relating to the obtained recipient status to the sender's user device 110. As an example, when a user selects a contact as an intended recipient of a message, a presence icon may be provided in connection with the contact entry (e.g., a car icon to indicate that the contact is in motion). As another example, the sender may be prompted to modify the message. For example, the sender may send a text message, may be informed that the intended recipient may be driving, and may be asked if the text message should be converted into a voicemail message.

Message type may be determined (block 740). For example, some sender rules may apply to particular types of messages. Messaging rule manager 310 may determine the type of message and may determine whether a sender rule has been generated for the determined type of message.

A sender rule, associated with the obtained recipient status and the determined message type, may be identified (block 750) and a notification type may be selected for the message based on the identified sender rule (block 760). As an example where sender rules are processed by user device 110, messaging rule manager 310 may access messaging rule DB 320, may identify a sender rule associated with the determined message type and the obtained recipient status, and may determine the notification type specified by the sender rule. As another example, where sender rules are processed by intelligent messaging system 130, notification manager 510 may access user DB 520, may identify a user record associated with the sender, may identify a sender rule associated with sender, the determined message type, and the obtained recipient status, and may determine the notification type specified by the sender rule.

A message may be processed based on the selected notification type (block 770). As an example where sender rules are processed by user device 110, messaging rule manager 310 may send the message, along with an instruction to apply the selected notification type to the message, to intelligent messaging system 130. As another example, where sender rules are processed by intelligent messaging system 130, notification manager 510 may apply the selected notification type to the received message.

If the notification type corresponds to an instruction to hold the message and to provide no notification to the recipient, notification manager 510 may store the received message in a buffer and may provide no notification about the message until the recipient status changes (e.g., until the intended recipient stops moving). If the notification type corresponds to an instruction to hold the message and to send a silent notification to the recipient, notification manager 510 may store the received message in a buffer and may provide an instruction to the intended recipient's user device 110 to generate a silent notification (e.g., a blinking light, a vibration alarm, etc.). If the notification type corresponds to an instruction to send the message and to send the silent notification to the recipient, notification manager 510 may provide the message to the recipient's user device along with an instruction to generate a silent notification. If the message corresponds to a text message and the notification type corresponds to an instruction to convert text messages to voicemail messages, notification manager 510 may generate a voicemail message based on the text message and may send the generated voicemail message to the recipient's voicemail account. The voicemail message may be generated using, for example, automatic voice reading software. If the message corresponds to a telephone call and the notification type corresponds to an instruction to send telephone calls directly to voicemail, notification manager 510 may forward the telephone call to the recipient's voicemail account. Furthermore, the sender rule (or a different sender rule associated with voicemail messages) may specify that voicemails delivered to the recipient's account should be associated with no notification or a silent notification, and thus the notification type may be applied to the generated voicemail.

A change in the recipient status may be detected (block 780) and the notification type may be updated based on the change in the recipient status (block 790). Status monitor 540 may obtain an updated recipient status and may determine that the recipient status associated with the sender rule no longer applies. For example, the recipient status may change from in motion to stationary. Status monitor 540 may wait a particular length of time to determine that the recipient is stationary in order to take into account situations such as user sitting at a light or sitting in traffic. Notification manager 510 may update the notification type to a regular notification type. For example, when the user stops moving for a particular length of time, regular notifications for messages delivered while the user was moving may be generated and any held messages may be forwarded to the recipient.

Figure 8:
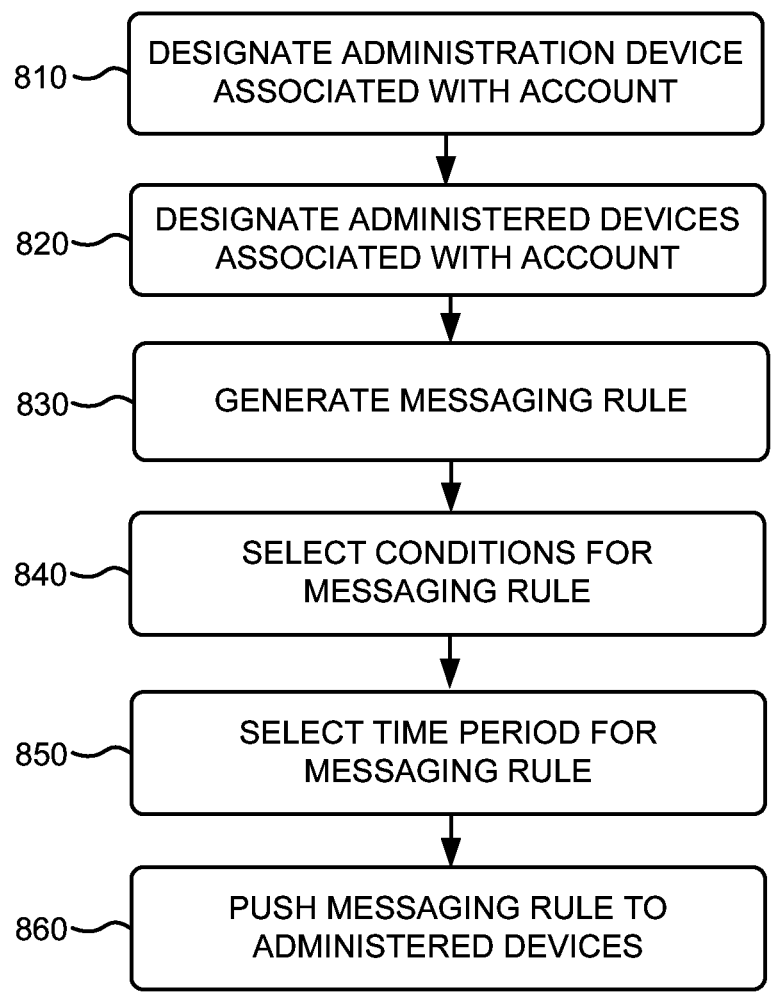
FIG. 8 is a flowchart for pushing a messaging rule to administered devices according to an implementation described herein.

FIG. 8 is a flowchart for pushing a messaging rule to administered devices according to an implementation described herein. In one implementation, the process of FIG. 8 may be performed by user device 110. In other implementations, some or all of the process of FIG. 8 may be performed by another device or a group of devices separate from and/or including user device 110, such as intelligent messaging system 130.

The process of FIG. 8 may include designating an administration device associated with an account (block 810) and administered devices associated with the account may be designated (block 820). For example, the user may select a particular user device 110, associated with the user's account, as the administration device and may select other devices, associated with the account (e.g., user devices 110 of other family members), as the administered devices. A messaging rule may be generated (block 830). As an example, the user of the administration device may generate a new messaging rule for one or more devices associated with the account.

Conditions for the messaging rule may be selected (block 840) and a time period for the messaging rule may be selected (block 850). As an example, the user may select that incoming messages for a particular user device 110 should all be received with a silent notification during the particular time period. As another example, the user may select that during a particular time period, only messages from a designated set of contacts may be received, while messages from other contacts are to be held until the time period expires. The messaging rule may be pushed to the administered devices (block 860). For example, the administration device may push the generated device to the one or more administered devices and each of the administered devices may store the received rule in the device's messaging rule DB 320.

Figure 9:
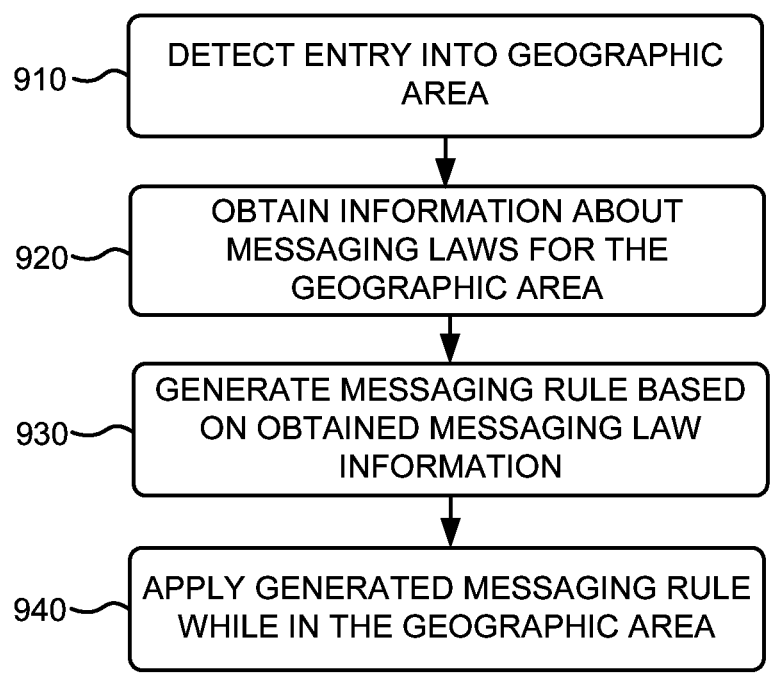
FIG. 9 is a flowchart for generating a messaging rule based on a geographic area according to an implementation described herein.

FIG. 9 is a flowchart for generating a messaging rule based on a geographic area according to an implementation described herein. In one implementation, the process of FIG. 9 may be performed by user device 110. In other implementations, some or all of the process of FIG. 9 may be performed by another device or a group of devices separate from and/or including user device 110, such as intelligent messaging system 130.

The process of FIG. 9 may include detecting entry into a geographic area (block 910). For example, status monitor 540 may determine that user device 110 has entered a geographic area associated with an administrative region, such as a country, state, county, or a city. Geographic DB 550 store sets of geographic coordinates (e.g., GPS coordinates) associated with particular geographic areas. Information about messaging laws for the geographic area may be obtained (block 920) and messaging rule may be generated based on the obtained messaging law information (block 930). For example, geographic DB 550 may store information about messaging laws associated with particular geographic areas. In some implementations, geographic DB 550 may store messaging rules for particular geographic areas. In other implementations, a messaging rule may be generated for a particular geographic area based on the information about messaging laws stored in geographic DB 550. The generated messaging rule may be applied while in the geographic area (block 940). For example, if the user enters a state that has banned texting while driving, outgoing text messages while in the state may be disabled when the user is moving faster than a threshold speed.

Figure 10:
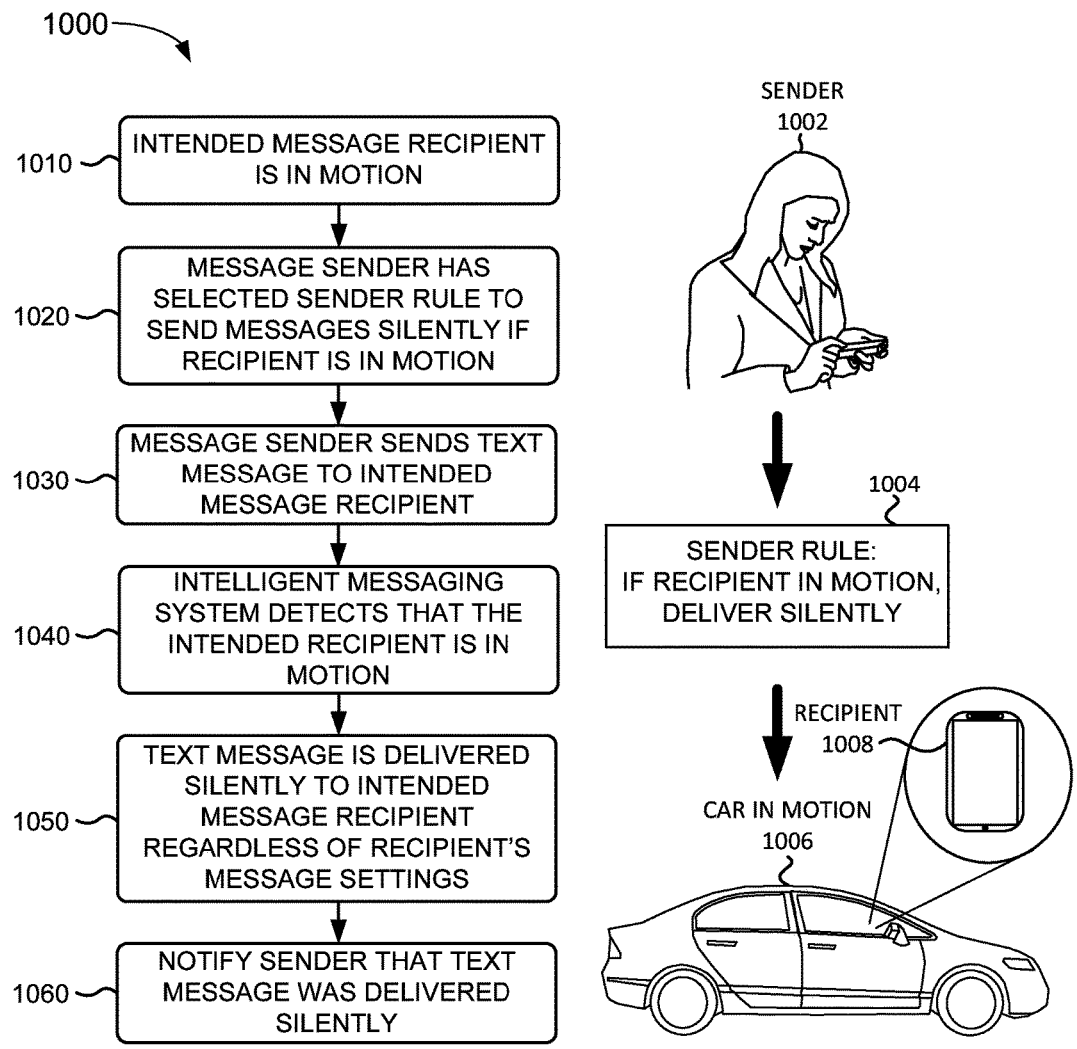
FIG. 10 is a diagram of a first exemplary scenario according to an implementation described herein.

FIG. 10 is a diagram of a first exemplary scenario 1000 according to an implementation described herein. As shown in FIG. 10, in scenario 1000 sender 1002 may be associated with sender rule 1004, which indicates that when the intended recipient is in motion (e.g., moving faster than a particular speed, such as 10 miles per hour), any message from the sender should be delivered silently. Assume recipient 1008 is in a car 1006 that is in motion (block 1010) and sender 1002 has selected sender rule 1004 (block 1020). Sender 1002 sends a text message to recipient 1008 (block 1030) and intelligent messaging system 130 detects that recipient 1008 is in motion (block 1040). Based on determining that recipient 1008 is in motion, intelligent messaging system 130 delivers the text message silently to recipient 1008 (block 1050). Furthermore, intelligent messaging system 130 may notify the sender that the text message was delivered silent (block 1060).

Figure 11:
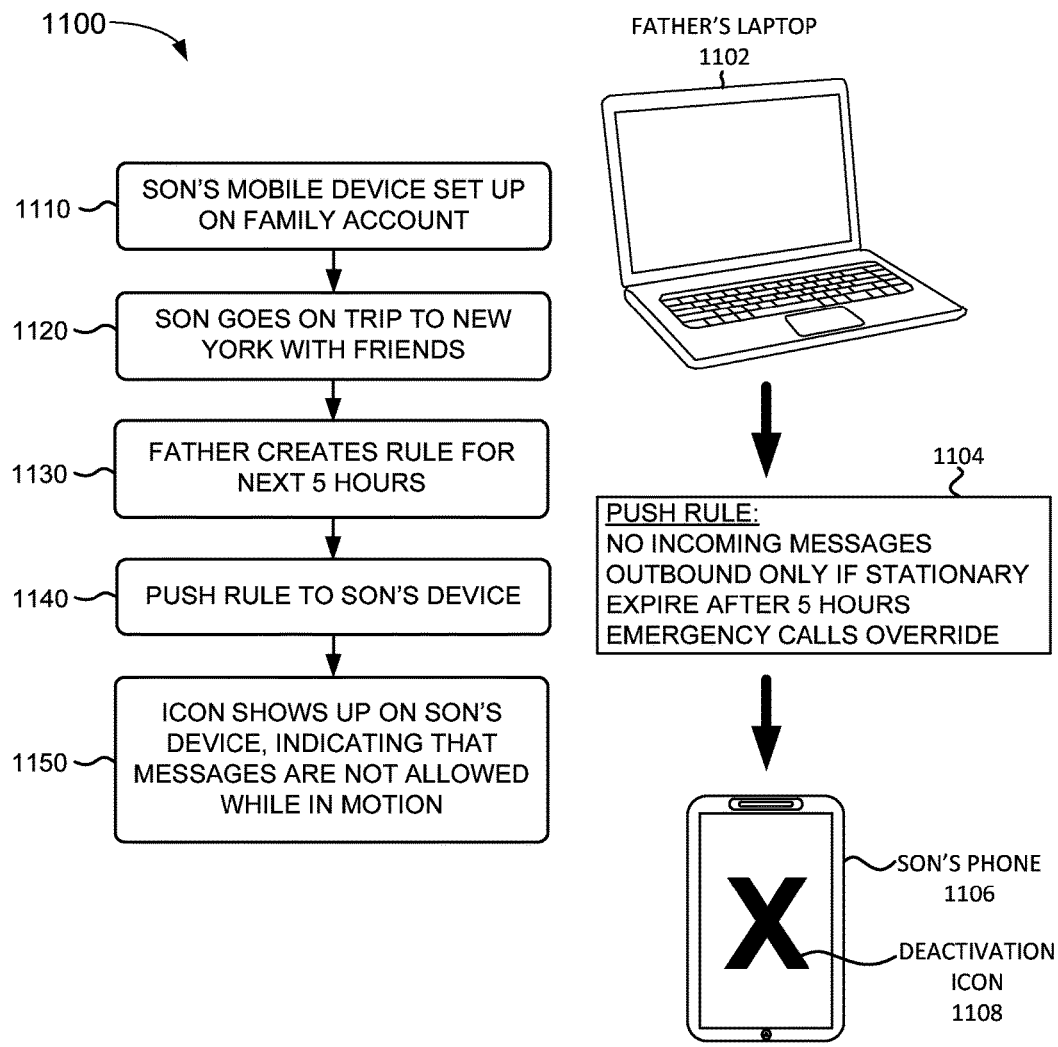
FIG. 11 is a diagram of a second exemplary scenario according to an implementation described herein.

FIG. 11 is a diagram of a second exemplary scenario 1100 according to an implementation described herein. As shown in FIG. 11, in scenario 1100, a father's laptop 1102 may be designated as an administration device with respect to the son's phone 1106 and the father may push rule 1104 to the son's phone. The son's mobile phone 1106 may be set up on the family account (block 1110) and the son may be on a trip to New York with friends (block 1120). The father may be concerned about the son using his phone while driving and may create a rule for the duration of the trip (e.g., next 5 hours) (block 1130). The rule may indicate that no incoming messages are to be received during the next 5 hours and outbound messages are only allowed if the son's phone 1106 is stationary, while allowing emergency calls to override the rule. The father may use laptop 1102 to push the rule to the son's phone 1106 (block 1140) and a deactivation icon 1108 may appear on the display of phone 1106 while the rule is in effect, indicating that messages are not allowed to be sent while in motion.

Figure 12:
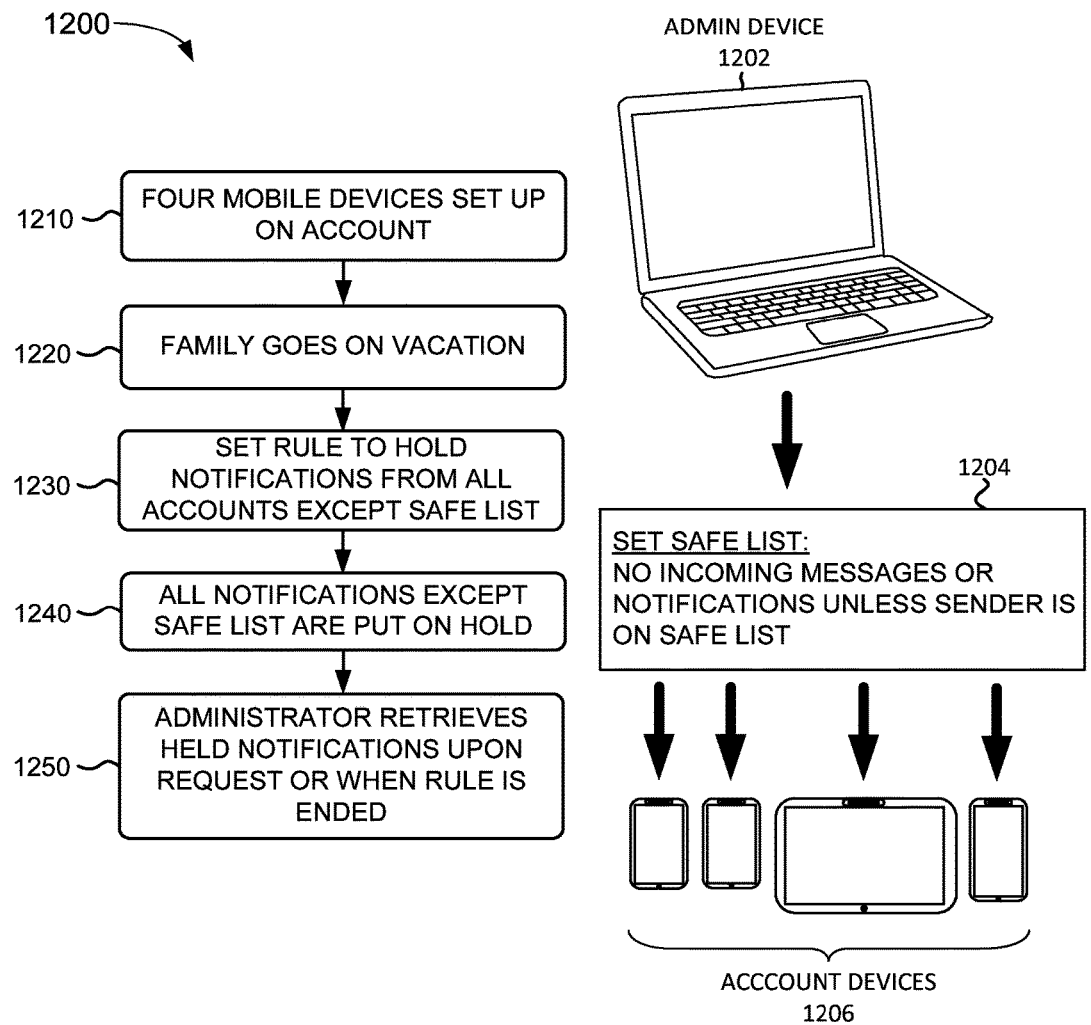
FIG. 12 is a diagram of a third exemplary scenario according to an implementation described herein.

FIG. 12 is a diagram of a third exemplary scenario 1200 according to an implementation described herein. As shown in FIG. 12, in scenario 1200, an administration device 1202 may be used to push a rule to other account devices 1206 to only accept messages from a safe list. Assume four mobile devices are set up on the family's account (block 1210) and the family goes on vacation (block 1220). The family may set up a rule to hold notifications from all accounts except for a safe list (block 1240). For example, the safe list may include other family members and close friends. Thus, during the time of the vacation, all notifications except one from the safe list are put on hold (block 1240) and the administrator may retrieve the held notifications upon request or when the rule has ended (block 1250).

Figure 13:
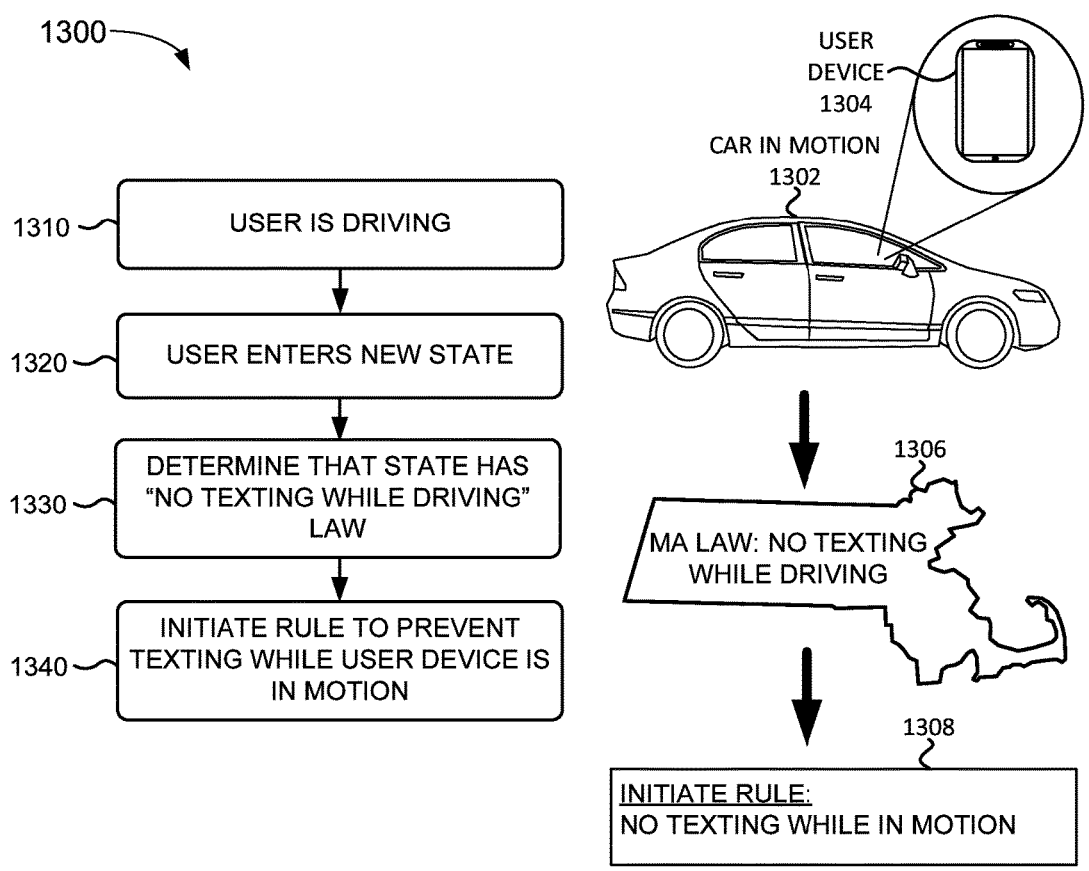
FIG. 13 is a diagram of a fourth exemplary scenario according to an implementation described herein.

FIG. 13 is a diagram of a fourth exemplary scenario 1300 according to an implementation described herein. As shown in FIG. 13, in scenario 1300, a car 1302 in motion may include user device 1304 and may enter Massachussets (MA), which has a law 1306 banning texting while driving, resulting in user device 1304 initiating a rule to disable texting while user device 1304 is in motion while in MA. Thus, if the user is driving (block 1310) and the user enters a new state (block 1320), a determination may be made that the state has a "no texting while driving" law (block 1330). In response, a messaging rule may be generated to prevent sending text messages from user device 1304 while in motion when inside the boundaries of MA (block 1340).

Figure 14:
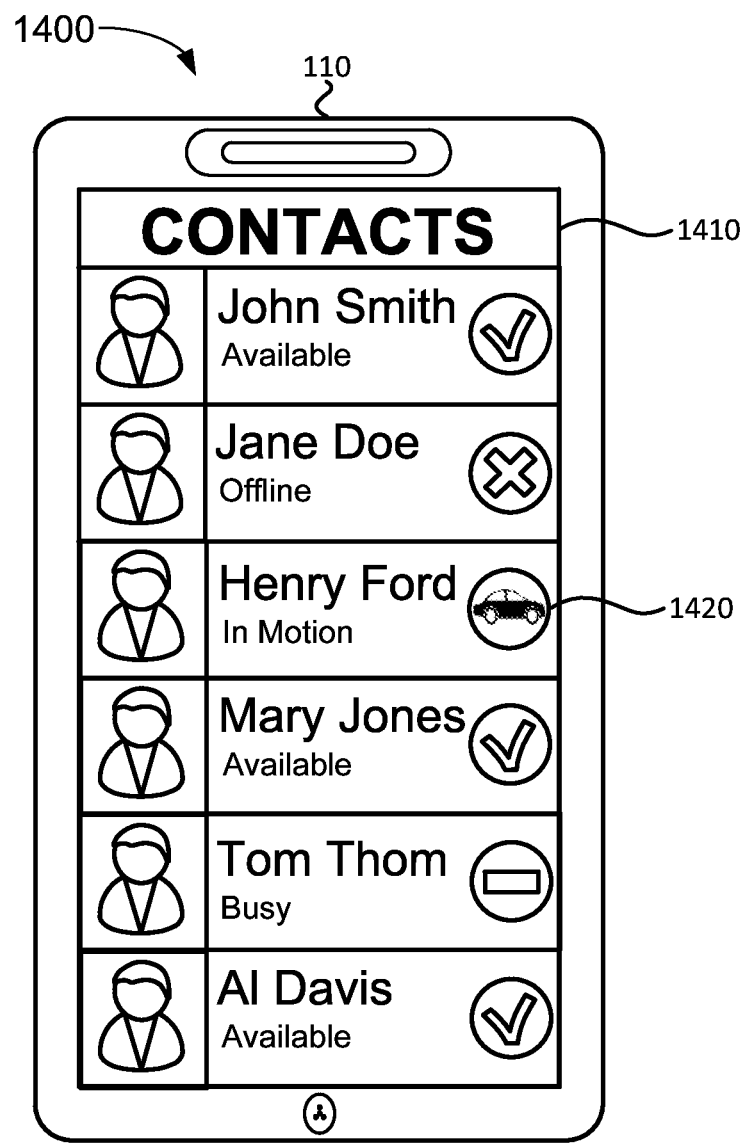
FIG. 14 is a diagram of an exemplary user interface according to an implementation described herein.

FIG. 14 is a diagram of an exemplary user interface 1400 according to an implementation described herein. As shown in FIG. 14, user interface 1400 may be generated by user device 110 when a user opens a contact list. A contact list 1410 may be generated that includes a presence icon for each contact. A presence icon may indicate the availability of a contact, such as whether the contact is available, offline, or busy. A presence icon of a contact may be based on the recipient status associated with the contact. For example, if a contact gives permission to provide movement data to other users, intelligent messaging system 130 may provide recipient status information to other users. Thus, contact list 1410, which includes an entry for the contact, may include a "contact in motion" presence icon 1430, which indicates that the contact is in motion. A "contact in motion" presence icon 1430, and/or accompanying textual presence information, may alert the user to the fact that the contact may be driving and may enable the user to decide to hold sending the message or to send the message with a modified notification type.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6-13, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
    intercepting, by a notification manager of the computer device, a message from a sender to a recipient;
    determining, by a status monitor of the computer device, that a user device associated with the recipient is in motion, wherein the user device is separate from the computer device;
    determining, by the status monitor, that the recipient is driving a vehicle based on historical data associated with the recipient;
    updating, by the status monitor, a recipient status associated with the recipient to indicate that the recipient is driving the vehicle;
    sending, by the computer device and to the sender, an indication that the recipient is driving and an option to modify the message;
    determining, by the computer device, a type of the message;
    accessing, by the notification manager, a database associated with the computer device, wherein the database stores a user record associated with the sender, wherein the user record includes a plurality of sender rules to apply to messages sent from the sender to one or more recipients, wherein the one or more recipients includes the recipient, wherein the plurality of sender rules are preconfigured by the sender and are to be applied to the messages sent from the sender to the one or more recipients, and wherein, for each sender rule, the database stores:
        a type of message associated with a particular message associated with the sender rule,
        a particular recipient status associated with the sender rule, and
        a notification type associated with the sender rule, wherein the notification type indicates how a particular recipient is to be notified of the particular message based on the particular recipient status;
    identifying, by the notification manager and from the database, the user record associated with the sender;
    identifying, by the notification manager and from the user record stored in the database, a sender rule, of the plurality of sender rules, associated with the sender based on the recipient status and the type of the message;
    determining, by the notification manager and from the database, a notification type for the message based on the identified sender rule;
    applying, by the notification manager, the determined notification type to the message, wherein applying the determined notification type includes converting the message from the type of the message to a different type of the message based on the identified sender rule;
    processing, by the notification manager, the message based on the determined notification type, wherein processing the message causes information associated with the message to be sent to a device associated with the recipient;
    selecting one or more devices as administered devices associated with the computer device;
    generating a first messaging rule;
    selecting one or more conditions for the generated first messaging rule;
    selecting a time period for the generated first messaging rule;
    pushing the generated first messaging rule to the selected one or more devices;
    detecting entry into a particular geographic area;
    obtaining information relating to messaging laws associated with the particular geographic area;
    generating a second messaging rule based on the obtained information; and
    applying the second messaging rule while in the particular geographic area.

2. The method of claim 1, wherein the notification type includes at least one of:
- an instruction to hold the message and to provide no notification to the recipient until the recipient status changes;
- an instruction to hold the message and to send a silent notification to the recipient;
- an instruction to send the message and to send the silent notification to the recipient;
- an instruction to convert a text message to a voicemail message; or
- an instruction to send a voice call directly to voicemail.

3. The method of claim 1, wherein determining the notification type for the message based on the identified sender rule further includes:
- determining the notification type based on the type of the message.

4. The method of claim 3, wherein the type of the message includes:
- a text message;
- a telephone call;
- a voicemail message;
- an instant messaging message; or
- a message associated with a social media account.

5. The method of claim 1, further comprising:
- receiving a request, from the sender, to configure the sender rule;
- receiving, from the sender, a message type for the sender rule in connection with the request to configure the sender rule;
- receiving, from the sender, the recipient status for the sender rule in connection with the request to configure the sender rule; and
- receiving, from the sender, the notification type for the sender rule in connection with the request to configure the sender rule.

6. The method of claim 1, further comprising:
- determining that the user device associated with the recipient is no longer in motion; and
- sending an updated notification regarding the message to the recipient, in response to determining that the recipient is no longer in motion.

7. The method of claim 1, wherein the first messaging rule includes one or more of:
- an instruction that no incoming message is to be received during the time period; or
- an instruction that an outbound message is to be allowed only if a device sending the outbound message is not moving.

8. The method of claim 1, wherein the first messaging rule includes an instruction that no incoming message is to be received unless the incoming message is associated with a safe list.

9. A computer system comprising:
- a memory to store a database containing a user record associated with a sender of messages, wherein the user record includes a plurality of sender rules to apply to messages sent from the sender of the messages to one or more recipients, wherein the plurality of sender rules are preconfigured by the sender and are to be applied to the messages sent from the sender to the one or more recipients, wherein the database stores, for each sender rule:
  - a type of message associated with a particular message associated with the sender rule,
  - a particular recipient status associated with the sender rule, and a notification type associated with the sender rule, wherein the notification type indicates how a particular recipient is to be notified of the particular message based on the particular recipient status;
- a status monitor to determine a status of a recipient of the one or more recipients, wherein, when determining the status of the recipient, the status monitor is configured to determine whether the recipient is driving a vehicle based on historical data associated with the recipient; and
- a processor configured to:
  - receive a message sent from the sender to the recipient;
  - update, based on receiving the status of the recipient from the status monitor, a recipient status associated with the recipient, wherein the recipient status includes an indication that the recipient is in motion and an indication that the recipient is driving;
  - send, to the sender, an indication that the recipient is driving and an option to modify the message;
  - determine a type of the message;
  - access the database to identify a sender rule, from the plurality of sender rules preconfigured by the sender, based on the recipient status and the type of the message;
  - determine a notification type for the message based on the identified sender rule;
  - apply the determined notification type to the message, wherein, when applying the determined notification type, the processor is further configured to convert the message from the type of the message to a different type of the message based on the identified sender rule;
  - process the message based on the determined notification type, wherein processing the message causes information associated with the message to be sent to a device associated with the recipient;
  - select one or more devices as administered devices associated with the computer system;
  - generate a first messaging rule;
  - select one or more conditions for the generated first messaging rule;
  - select a time period for the generated first messaging rule;
  - push the generated first messaging rule to the selected one or more devices;
  - detect entry into a particular geographic area;
  - obtain information relating to messaging laws associated with the particular geographic area;
  - generate a second messaging rule based on the obtained information; and
  - apply the second messaging rule while in the particular geographic area.

10. The computer system of claim 9, wherein the notification type includes at least one of:
- an instruction to hold the message and to provide no notification to the recipient until the recipient status changes;
- an instruction to hold the message and to send a silent notification to the recipient;
- an instruction to send the message and to send the silent notification to the recipient;
- an instruction to convert a text message to a voicemail message; or
- an instruction to send a voice call directly to voicemail.

11. The computer system of claim 9, wherein, when determining the notification type for the message based on the identified sender rule, the processor is further configured to:
   determine the notification type based on the type of message.

12. The computer system of claim 9, wherein the processor is further configured to:
   receive a request, from the sender, to configure the sender rule;
   receive, from the sender, a message type for the sender rule in connection with the request to configure the sender rule;
   receive, from the sender, the recipient status for the sender rule in connection with the request to configure the sender rule; and
   receive, from the sender, the notification type for the sender rule in connection with the request to configure the sender rule.

13. The computer system of claim 9, wherein the processor is further configured to:
   determine that the recipient is no longer in motion; and
   send an updated notification regarding the message to the recipient, in response to determining that the recipient is no longer in motion.

14. The computer system of claim 9, wherein the messaging rule includes one or more of:
   an instruction that no incoming message is to be received during the time period; or
   an instruction that an outbound message is to be allowed only if a device sending the outbound message is not moving.

15. The computer system of claim 9, wherein the messaging rule includes an instruction that no incoming message is to be received unless the incoming message is associated with a safe list.

16. A non-transitory computer-readable medium storing instructions executable by one or more processors, the non-transitory computer-readable medium comprising:
   one or more instructions to receive a message sent from a sender to a recipient;
   one or more instructions to determine that a user device associated with the recipient is in motion, wherein the user device is remote from the one or more processors;
   one or more instructions to determine that the recipient is driving a vehicle based on historical data associated with the recipient;
   one or more instructions to update a recipient status associated with the recipient to indicate that the recipient is driving the vehicle;
   one or more instructions to send, to the sender, an indication that the recipient is driving and an option to modify the message;
   one or more instruction to determine a type of the message;
   one or more instructions to access a database, wherein the database stores a user record associated with the sender, wherein the user record includes a plurality of sender rules to apply to messages sent from the sender to one or more recipients, wherein the one or more recipients includes the recipient, wherein the plurality of sender rules are preconfigured by the sender and are to be applied to the messages sent from the sender to the one or more recipients, and wherein, for each sender rule, the database stores:
      a type of message associated with a particular message associated with the sender rule,
      a particular recipient status associated with the sender rule, and
      a notification type associated with the sender rule, wherein the notification type indicates how a particular recipient is to be notified of the particular message based on the particular recipient status;
   one or more instructions to identify, from the database, the user record associated with the sender;
   one or more instructions to identify, from the user record stored in the database, a sender rule, of the plurality of sender rules, associated with the sender based on the recipient status and the type of message;
   one or more instructions to determine, from the database, a notification type for the message based on the identified sender rule;
   one or more instructions to apply the determined notification type to the message, wherein the one or more instruction to apply the determined notification type include one or more instructions to convert the message from the type of the message to a different type of the message based on receiving, from the sender, an instruction to modify the message;
   one or more instructions to process the message based on the determined notification type, wherein processing the message causes information associated with the message to be sent to a device associated with the recipient.

* * * * *